US009694847B2

(12) United States Patent
Yoshida et al.

(10) Patent No.: US 9,694,847 B2
(45) Date of Patent: Jul. 4, 2017

(54) TORQUE DETECTION STRUCTURE FOR POWER STEERING DEVICE, AND POWER STEERING DEVICE USING SAME

(71) Applicant: HITACHI AUTOMOTIVE SYSTEMS STEERING, LTD., Hiki-gun, Saitama (JP)

(72) Inventors: Osamu Yoshida, Yokohama (JP); Tatsuyoshi Maruyama, Atsugi (JP); Kiyotaka Shirakubo, Ayase (JP)

(73) Assignee: HITACHI AUTOMOTIVE SYSTEMS STEERING, LTD., Saitama (JP)

( * ) Notice: Subject to any disclaimer, the term of this patent is extended or adjusted under 35 U.S.C. 154(b) by 62 days.

(21) Appl. No.: 14/646,874

(22) PCT Filed: Jan. 20, 2014

(86) PCT No.: PCT/JP2014/050986
§ 371 (c)(1),
(2) Date: May 22, 2015

(87) PCT Pub. No.: WO2014/141738
PCT Pub. Date: Sep. 18, 2014

(65) Prior Publication Data
US 2015/0307126 A1    Oct. 29, 2015

(30) Foreign Application Priority Data

Mar. 14, 2013    (JP) .................................. 2013-051232

(51) Int. Cl.
*B62D 5/04*    (2006.01)
*B62D 6/10*    (2006.01)
(Continued)

(52) U.S. Cl.
CPC ................ *B62D 6/10* (2013.01); *G01L 3/104* (2013.01); *G01L 5/221* (2013.01)

(58) Field of Classification Search
CPC ...................................................... B62D 6/10
(Continued)

(56) References Cited

U.S. PATENT DOCUMENTS 4,996,890 A  *  3/1991  Taniguchi ............... G01L 3/104
                                                    73/862.331
6,239,529 B1    5/2001  Chikaraishi
(Continued)

FOREIGN PATENT DOCUMENTS

JP           3329294 B2      9/2002
JP         2004-309463 A    11/2004

*Primary Examiner* — Tony Winner
(74) *Attorney, Agent, or Firm* — Foley & Lardner LLP

(57) ABSTRACT

A ball bearing for rotatably supporting a steering shaft, which is comprised of an input shaft and an output shaft connected to each other via a torsion bar is secured by a lock nut. The lock nut has an inside diameter Y1 greater than a maximum outside diameter X6 of the sensor body of a torque sensor mainly configured from a permanent magnet, first and second yoke members, and a magnetic sensor, which are disposed on the outer periphery of the steering shaft. With this configuration, the torque sensor and the lock nut radially overlap with each other, thus reducing the size of a device. Also, because of the lock nut being assembled so as to pass through the outer peripheral side of the torque sensor, component parts can be installed from one direction, thus improving the assembling workability of the device.

18 Claims, 7 Drawing Sheets

(51) Int. Cl.
*G01L 5/22* (2006.01)
*G01L 3/10* (2006.01)

(58) Field of Classification Search
USPC .................................. 180/443, 444, 417
See application file for complete search history.

(56) References Cited

U.S. PATENT DOCUMENTS

| | | | |
|---|---|---|---|
| 6,912,923 B2 | 7/2005 | Froehlich et al. | |
| 8,727,065 B2* | 5/2014 | Kuroumaru | B62D 5/0409 |
| | | | 180/443 |
| 2012/0273294 A1* | 11/2012 | Yoshida | G01L 3/105 |
| | | | 180/446 |
| 2013/0180794 A1* | 7/2013 | Shiino | B62D 5/04 |
| | | | 180/444 |

\* cited by examiner

TORQUE DETECTION STRUCTURE FOR POWER STEERING DEVICE, AND POWER STEERING DEVICE USING SAME

TECHNICAL FIELD

The present invention relates to a torque detection structure for a power steering device, which is applicable to an automotive power steering device for detecting a steering torque by a driver, and a power steering device using the same.

BACKGROUND ART

For instance, as a prior art torque detection structure, which is applicable to an automotive power steering device, the torque detection structure as described in the following Patent document 1 is well known.

Briefly speaking, the prior art torque detection structure uses a torque sensor provided with a magnetic member, first and second yoke members, a pair of magnetic flux concentrators, that is, first and second magnetic concentrating members, and a magnetic sensor. A steering shaft is comprised of two shaft members connected to each other via a torsion bar such that these shaft members are rotated relative to each other. The magnetic member is connected to the outer periphery of one shaft member of the two shaft members and configured to have a plurality of magnetic poles in its circumferential direction. The first and second yoke members are a pair of annular members formed of a soft-magnetic material and connected to the outer periphery of the other shaft member of the two shaft members via a specified holder. Each of the yoke members has a plurality of radially-inward extending fingers. The yoke members are arranged to axially oppose each other. The magnetic concentrating members are partly configured within a circumferential region of respective yoke members and interposed between both the yoke members so as to axially oppose each other, for generating a magnetic field between both the yoke members. The magnetic sensor is accommodated and placed in an air gap defined between these magnetic concentrating members, for detecting a magnetic flux passing between the opposed magnetic concentrating members. The torque sensor is configured to detect, based on a change in the magnetic flux (a magnetic flux density) detected by the magnetic sensor, a torque inputted to the steering shaft.

CITATION LIST

Patent Literature

Patent document 1: Japanese patent provisional publication No. 2004-309463 (A)

SUMMARY OF INVENTION

Technical Problem

By the way, although it is not shown in the Patent document 1, in supporting the steering shaft of the power steering device, a bearing is often disposed inside of a housing and located at an intermediate portion (the vicinity of the connected portion of the two shaft members) of the steering shaft. In such a case, a separate fixing member is needed to fix an outer race of the bearing within the housing. The relationship between the dimensions and layout of the fixing member and the torque sensor, leads to various inconveniences.

That is so say, for instance, when the outside diameter of the torque sensor is set relatively greater than the inside diameter of the fixing member, the torque sensor and the fixing member are axially arranged in series. This leads to the problem of the axially large-sized housing, thereby increasing the total size of the device.

The aforementioned torque sensor is, first of all, integrally assembled on the steering shaft, and then the integrally-assembled torque sensor is inserted and disposed in the housing. Therefore, on the assumption that, owing to the previously-discussed dimensional relationship, the bearing is arranged on the opposite side with respect to the direction in which the torque sensor has been inserted, the bearing has to be inserted and disposed from the opposite side with respect to the direction of insertion of the torque sensor assembled integral with the steering shaft, after the torque sensor together with the steering shaft has been inserted and disposed in the housing. In this manner, the steering shaft, the torque sensor, and the bearing cannot be inserted and disposed in one axial direction. This leads to the troublesome assembling workability.

It is, therefore, in view of the previously-described drawbacks of the prior art, an object of the invention to provide a torque detection structure for a power steering device capable of realizing the improved assembling workability as well as downsizing of the device.

Solution to Problem

In order to accomplish the aforementioned and other objects, according to the present invention, on a power steering device mounted on an automotive vehicle, there is provided a torque detection structure for the power steering device for detecting a steering torque by a driver, comprising a steering shaft having an input shaft configured to rotate in synchronism with rotation of a steering wheel and an output shaft connected via a torsion bar to the input shaft for transmitting rotation from the input shaft to steered road wheels, a housing having one axial opening formed on one axial side of opposite axial directions of a rotation axis of the steering shaft and configured to accommodate the output shaft in the housing, a ball bearing having an inner race, balls, and an outer race and inserted from the one axial opening and accommodated and disposed in the housing for rotatably supporting the output shaft in the housing, a fixing member formed into a circular-arc shape or an annular shape and inserted and disposed from the one axial opening into the housing and configured to fix the outer race to the housing with the fixing member fixed to the housing in a state where one end of the fixing member has been brought into abutted-engagement with the outer race, and a torque sensor having an outside diameter set less than an inside diameter of the fixing member and configured to generate an electrical signal that changes in accordance with an amount of torsional deformation of the torsion bar.

Advantageous Effects of Invention

According to the present invention, it is possible to avoid the mutual interference between the fixing member and the torque sensor in the radial direction. Hence, the fixing member and the torque sensor can be arranged to radially overlap each other, thereby ensuring downsizing of the device. Additionally, it is possible to improve the assembling workability by assembling the fixing member so as to pass the outer periphery of the torque sensor.

DESCRIPTION OF EMBODIMENTS

Respective embodiments of a torque detection structure for a power steering device of the invention and a power steering device for the same are hereinafter described in detail with reference to the drawings. By the way, in the respective embodiments, the torque detection structure is exemplified in an automotive rack-and-pinion electric power steering device.

Figure 1:
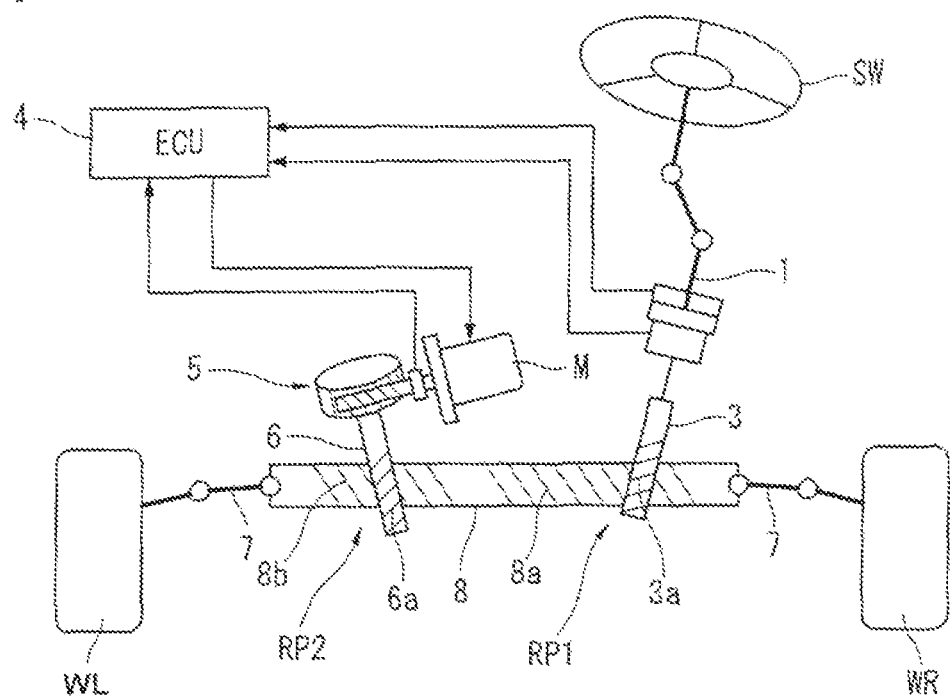
FIG. 1 is a schematic drawing illustrating the construction of a power steering device of the invention.

FIGS. 1-6 show the first embodiment of the torque detection structure of the invention. As shown in FIG. 1, an electric power steering device that is an application target, to which the torque detection structure can be applied, is constructed such that a steering shaft is linked through a first rack-and-pinion mechanism RP1 to steered road wheels WR, WL, and that a second output shaft 6 is linked through a second rack-and-pinion mechanism RP2 to the steered road wheels WR, WL. The steering shaft is comprised of an input shaft 1 whose one end is linked to a steering wheel SW and a first output shaft 3 (corresponding to an output shaft of the invention) whose one end is connected via a torsion bar 2 to the input shaft 1, such that the first output shaft and the input shaft are rotated relative to each other. The first rack-and-pinion mechanism is located on one side in a vehicle-body width direction. The second output shaft is linked via a specified speed reduction gear 5, such as a worm gear or the like, to an electronic motor M, which is drive-controlled by means of an electronic control unit ECU 4 responsively to an output signal from a torque sensor TS disposed on the outer periphery of the steering shaft. The second rack-and-pinion mechanism is located on the opposite side in the vehicle-body width direction.

Hereupon, the first rack-and-pinion mechanism RP1 is comprised of a first pinion toothed gear 3a and a first rack toothed gear 8a. The first pinion toothed gear is formed on the other end of the first output shaft 3. Both ends of a rack bar 8 are linked via tie rods 7, 7 to respective steered road wheels WR, WL. The first rack toothed gear 8a is formed within a predetermined region of one side of rack bar 8. The second rack-and-pinion mechanism RP2 is comprised of a second pinion toothed gear 6a and a second rack toothed gear 8b. The second pinion toothed gear is formed on the top end of the second output shaft 6. The second rack toothed gear 8b is formed within a predetermined region of the other side of rack bar 8.

With the previously-discussed arrangement, torsional deformation of torsion bar 2 occurs responsively to steering torque inputted from the steering wheel SW to the input shaft 1. Rotary motion of the first output shaft 3, rotated based on rotational torque caused by recovery of torsion bar 2 arising from the torsional deformation, is converted into straight-line motion of rack bar 8 via the first rack-and-pinion mechanism RP1. Rotary motion of the second output shaft 6, rotated based on steering assist torque generated by the rotor M responsively to the steering torque, is converted into straight-line motion of rack bar 8 via the second rack-and-pinion mechanism RP2. Hence, it is possible to change the directions of steered road wheels WR, WL, while providing a steering assist by the electric motor M.

Figure 2:
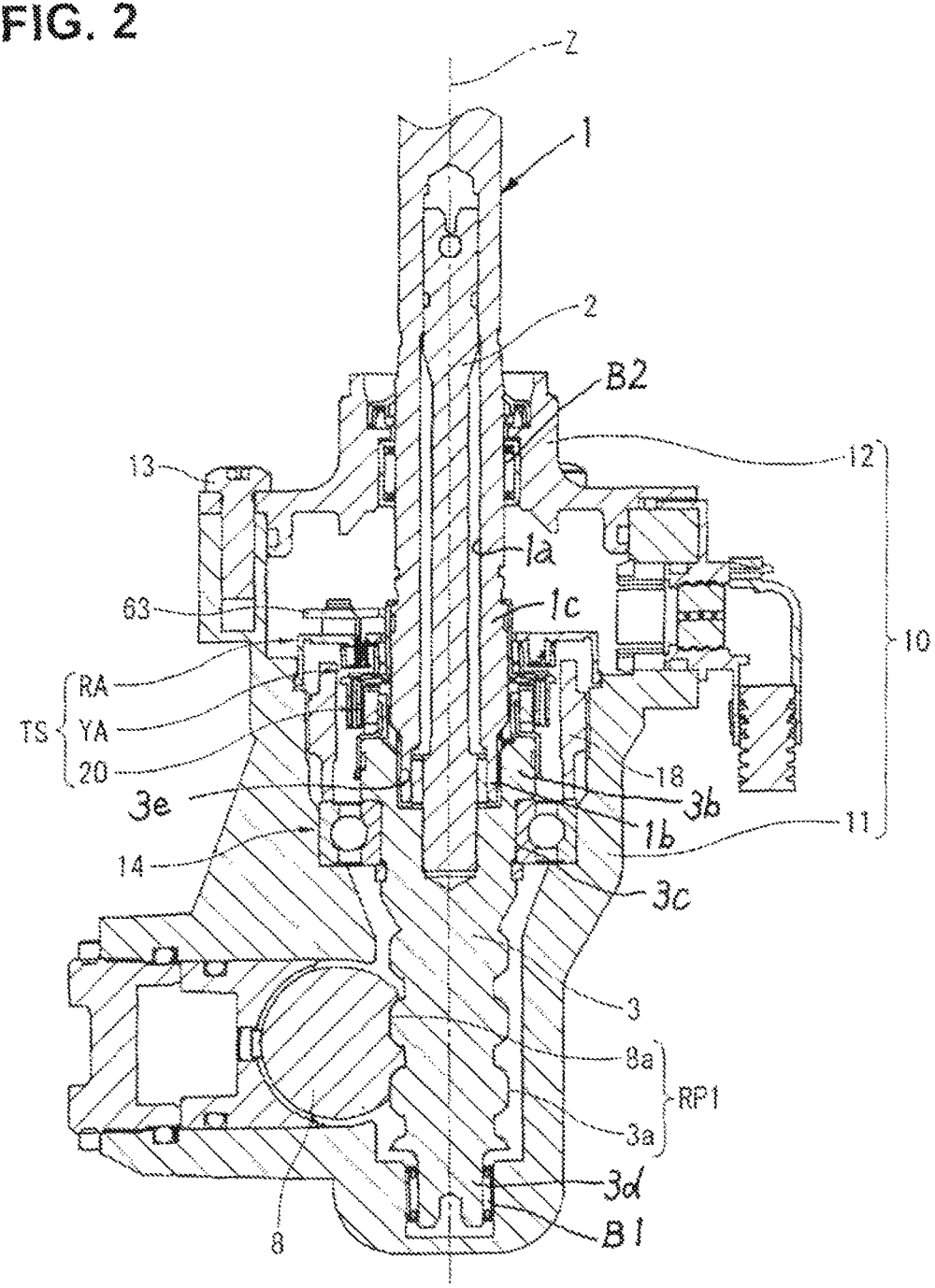
FIG. 2 is a cross-sectional view illustrating a first embodiment of a torque detection structure of the invention, more concretely a longitudinal cross-sectional view illustrating the steering system (the vicinity of a first rack-and-pinion mechanism) shown in FIG. 1.

As seen from the drawings, in particular, FIG. 2, regarding the steering shaft, the other end of input shaft 1 and the entire shaft section of the first output shaft 3 are accommodated in a housing 10, which is split into upper and lower halves. Hereupon, housing 10 is constructed by fastening a housing main body 11 and a cover member 12 together with a plurality of bolts 13 arranged in the circumferential direction of the cover member. The first rack-and-pinion mechanism RP1 is housed in the housing main body. The cover member is provided to close the upper opening end of housing main body 11 and configured to support the input shaft 1.

Also regarding the steering shaft, the other end of the first output shaft 3, which is housed in the housing main body 11, is supported by an output-side bearing B1 that is a generally-known needle bearing and an input-side bearing B2 that is a generally-known needle bearing. The vicinity of the connected portion of the input shaft 1 and the output shaft 3, corresponding to the intermediate portion of the steering shaft, that is, the vicinity of the one end of the first output shaft 3, is rotatably supported by a ball bearing 14 configured to have a comparatively large diameter as compared to both the bearing B1 and the bearing B2.

The one end or input shaft 1 is linked via a predetermined link member (not shown) to the steering wheel SW. At the other end of input shaft 1, a torsion-bar housing part 1a is bored along the axial direction, such that almost the entire length of torsion bar 2 is accommodated in the torsion-bar housing part 1a. Also, the other end of input shaft 1 is configured as a comparatively small-diameter fitting and inserting portion 1b, which is fitted and inserted into an axial bore 3e (described later) of the first output shaft 3. The fitting and inserting portion 1b and the lower end of torsion bar 2, protruding from the fitting and inserting portion 1b, are both accommodated in the axial bore 3e (described later) of the first output shaft 3, such that the input shaft 1 and the first output shaft 3 are connected to each other via the torsion bar 2. Also provided at the upper section of the fitting and inserting portion 1b is a comparatively large-diameter yoke mounting portion 1c. The comparatively large-diameter yoke mounting portion is formed as a stepped, enlarged-diameter section in close proximity to the fitting and inserting portion 1b.

The first output shaft 3 is configured to have a large-diameter portion 3b having a maximum diameter, a middle-diameter portion 3c, a small-diameter portion 3d having a minimum diameter, and the pinion toothed gear 3a. The large-diameter portion 3b is provided at the one end of the first output shaft 3 and dimensioned to have an outside diameter X2 greater than an outside diameter X1 of yoke mounting portion 1c. The large-diameter portion is used to fix a magnetic member 20 (described later) thereto. The middle-diameter portion is formed as a stepped, reduced-diameter section whose diameter is reduced from the large-diameter portion 3b toward the other end of the first output shaft and configured to be supported by the ball bearing 14. The small-diameter portion 3d is provided at the other end of the first output shaft and configured to be supported by the output-side bearing B1. The pinion toothed gear 3a is provided between the small-diameter portion 3d said the middle-diameter portion 3c. The axial bore 3e is bored in the one end of the first output shaft 3, for receiving and accommodating both the fitting and inserting portion of input shaft 1 and the lower end of torsion bar 2 in the axial bore. The other end of input shaft 1 is accommodated in the axial bore 3e so as to be rotatable relative to the axial bore. In contrast, the lower end of torsion bar 2 is fixed to the axial bore so as to be rotatable together with the axial bore.

Figure 3:
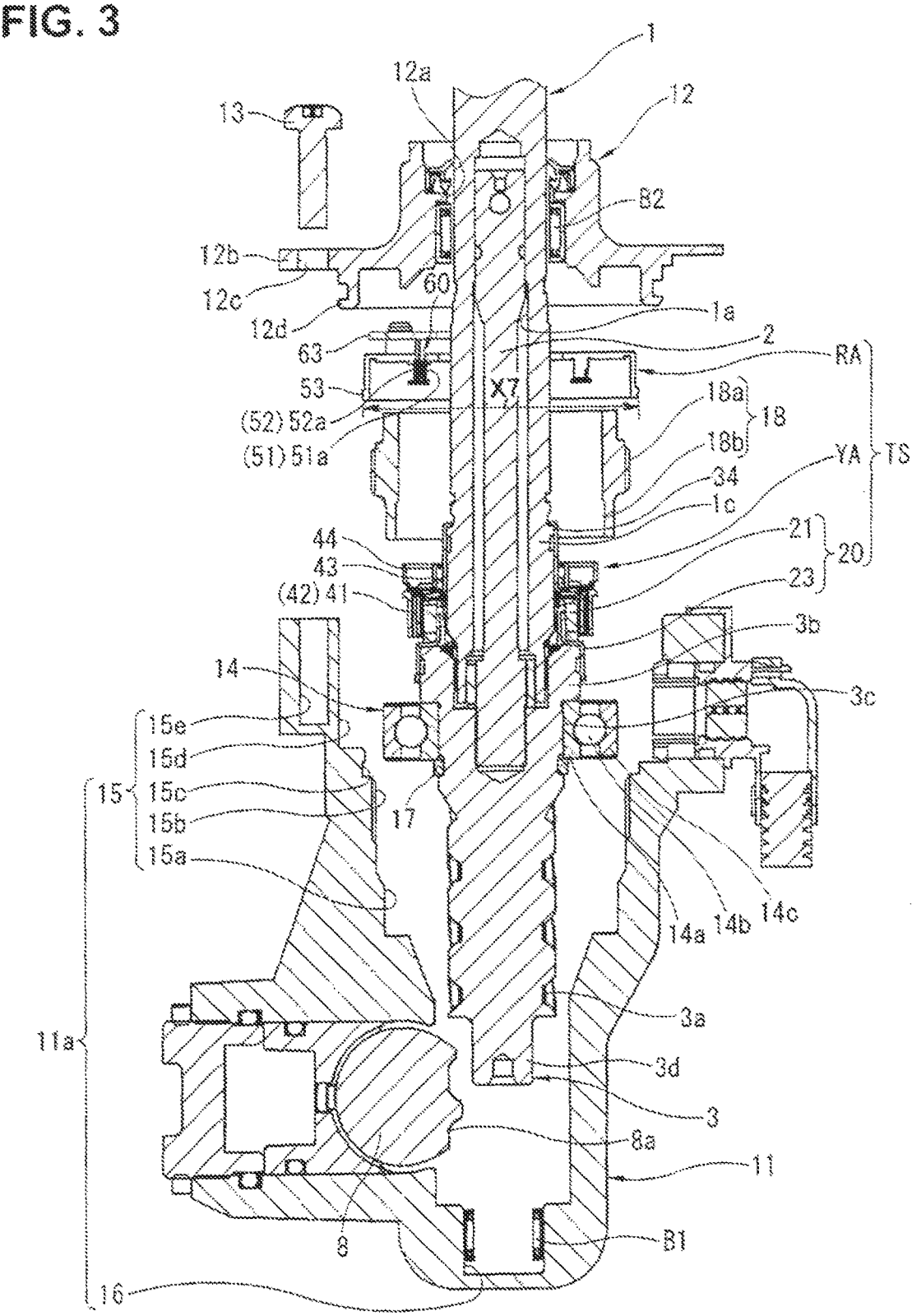
FIG. 3 is a disassembled sectional view illustrating the torque sensor itself shown in FIG. 2.

As shown in FIGS. 2-3, housing main body 11 is formed of an aluminum-based material and formed as a substantially cylindrical, stepped, reduced-diameter bore whose diameter is reduced downward from its opening end. The housing main body is constructed by a pinion housing part 11a and a cylindrical rack housing part 11b. The pinion housing part is configured to accommodate the pinion side of the first rack-and-pinion mechanism RP1 (i.e., the first output shaft 3). The rack housing part is provided at the lower end of pinion housing part 11a and arranged to be substantially perpendicular to the pinion housing part 11a. The rack housing part is configured to accommodate the rack side of the first rack-and-pinion mechanism RP1 (i.e., the rack shaft 8). The torque sensor TS and the ball bearing 14 are accommodated in a large-diameter section 15 formed on the side of the opening end of pinion housing part 11a. The other end of the first output shaft 3 is accommodated in a small-diameter section 16 formed on the opposite side of the opening end.

The above-mentioned large-diameter section 15 is configured to have a bearing housing part 15a, a female-screw threaded part 15b, a ring fitting shouldered part 15c, and a housing fitting part 15d. The bearing housing part is provided at the innermost end of the large-diameter section 15 for housing the ball bearing 14 therein. The female-screw threaded part 15b is configured as a somewhat enlarged-diameter threaded section whose diameter is enlarged from the bearing housing part 15a toward the opening end, and configured such that a lock nut 18 (described later) is screwed into the female-screw threaded part. The ring fitting shouldered part is formed as a stepped, enlarged-diameter section whose diameter is further enlarged from the female-screw threaded part 15b toward the opening end, and used to retain or mount a ring assembly RA (described later) thereon (that is, used to fit an insulating part 53 (described later) thereto). The housing fitting part is configured as an enlarged-diameter section whose diameter is enlarged from the ring fitting shouldered part 15c toward the opening end, and used to fit the cover member 12 thereto. Furthermore, female-screw threaded holes 15e are formed in the outer peripheral area of the opening end of housing fitting part 15d, for fastening the housing main body 11 and the cover member 12 together with bolts 13 screwed into the respective female-screw threaded holes.

In the same manner as the housing main body 11, cover member 12 is formed of an aluminum-based material and formed at its center with a shaft insertion hole 12a (a through hole) into which the input shaft 1 is inserted. Also, the cover member has a flanged part 12b formed to protrude from its circumference. A plurality of bolt insertion holes 12c (through holes) are formed in the flanged part and configured such that the previously-discussed bolts 13 are inserted into the respective bolt insertion holes. Moreover, a fitting protruding part 12d is formed to protrude from the end face of cover member 12, facing the housing main body 11, and configured to permit the fitting protruding part to be fitted to the housing fitting part 15d. Hence, coaxial arrangement of both the two members 11, 12, that is, coaxial support of the steering shaft by means of both the two members 11, 12 can be ensured by fitting and inserting the fitting protruding part 12d into the housing fitting part 15d.

Ball bearing 14 is constructed by an inner race 14a, an outer race 14b, and balls 14c. The inner race is fixed and retained so as to be sandwiched between the large-diameter portion $3_b$ and a C ring 17 installed at the lower end of the middle-diameter portion 3c of the first output shaft 3. The outer race is accommodated and disposed in the bearing housing part 15a and configured to be fixed and retained so as to be sandwiched between the innermost end wall of the bearing housing part 15a and the substantially cylindrical-hollow look nut 18 serving as a fixing member. The balls are a plurality of rolling elements interposed between the inner race 14a and the outer race 14b while assuring rolling contact between them.

Hereupon, lock nut 18 is formed of a prescribed zinc material. The lock nut is configured to have an approximately constant inside diameter Y1. Also, its outside diameter is configured as a stepped-diameter section. Concretely, the axial intermediate portion of the lock nut is formed as a thick-walled section having a maximum diameter and a maximum wall thickness. A male-screw threaded part 18a, which is brought into threaded-engagement with the female-screw threaded part 15b, is formed around the circumference of the intermediate portion. A portion formed on the upper end side of male-screw threaded part 18a is configured as a thin-walled section thinner than the male-screw threaded part 18a, to permit the thin-walled section to be accommodated and disposed inside of the insulating part 53 (described later). A portion formed on the lower end side of male-screw threaded part 18a is configured as a minimum wall-thickness press-fit part 18b into which the outer race 14b is press-fitted.

As shown in FIGS. 2-6, torque sensor TS is mainly constructed by the magnetic member 20, a pair of yoke members, that is, first and second yoke members 31, 32, a pair of magnetic flux concentrators, that is, first and second magnetic concentrating rings 51, 52, and a pair of magnetic sensors 60, 60. Magnetic member 20 is formed into a substantially cylindrical shape, and configured to be mounted and fixed onto the large-diameter portion 3b of the first output shaft 3 so as to be rotatable together with the first output shaft 3. The first yoke member and the second yoke member are configured as a pair of substantially annular or cylindrical members formed of a soft-magnetic material. These yoke members are both mounted and fixed onto the yoke mounting portion 1c of input shaft 1 so as to be rotatable together with the input shaft 1. One end side (the lower end side in FIG. 2) of these yoke members is arranged to radially oppose the magnetic member 20. Additionally, the first yoke member and the second yoke member are configured to be spaced apart from each other without direct-connection between them. The first magnetic concentrating ring and the second magnetic concentrating ring are accommodated and disposed in a radial clearance C1 defined between the first yoke member 31 and the second yoke member 32 at the other end side of these yoke members 31, 32, and formed into a substantially annular shape, for concentrating a magnetic field (a magnetic flux), produced by the magnetic member 20 and leaked toward the other end side of these yoke members 31, 32, within a predetermined region. The magnetic sensor pair 60, 60 is accommodated and disposed within a predetermined air gap between these two magnetic concentrating rings 51, 52 in a radial clearance C2 defined between them, for detecting a magnetic flux passing between these magnetic concentrating rings 51, 52.

Magnetic member 20 is constructed by a permanent magnet 21 and a sleeve 23. The permanent magnet is formed of a magnetic material and formed into an annular shape. The permanent magnet is configured to have a plurality of poles arranged such that two different poles (i.e., north pole and south pole) alternate with each other in the circumferential direction. The sleeve is formed of a prescribed metal material and formed into a substantially cylindrical shape. One end of the sleeve is connected to the inner periphery of permanent magnet 21 in an insulated state via an insulating part 22 formed of a prescribed resin material. These components 21, 23 are integrally molded via the previously-discussed resin material and united with each other. The magnetic member is fixedly connected to the outer periphery of the first output shaft 3 via the sleeve 23 by circumferentially laser-welding the top end of sleeve 23 fitted onto the large-diameter portion 3b of the first output shaft 3.

More concretely, sleeve 23 is formed as a stepped-diameter section so as to have a minimum inside diameter Y2 (the inside diameter of the other end 23c described later) greater than the maximum outside diameter X1 (the outside diameter of yoke mounting portion 1c) of input shaft 1. The sleeve is fitted onto the large-diameter portion 3b from the side of input shaft 1 by bringing a stepped part 23b of one end 23a of sleeve 23, formed as a stepped, enlarged-diameter section, into abutted-engagement with an end face of the large-diameter portion 3b of the first output shaft 3. The previously-discussed permanent magnet 21 is fixedly connected onto the outer periphery of the other end 23c having a comparatively small diameter reduced radially inward, as compared to the one end 23a. The permanent magnet 21 and the large-diameter portion 3b are configured to axially overlap with each other by setting the outside diameter X3 of permanent magnet 21, that is, the outside diameter X3 of the one end 23a containing the permanent magnet 21, less than the outside diameter X2 of the large-diameter portion 3b of the first output shaft 3. By virtue of the previously-discussed configuration, it is possible to effectively utilize the dead space defined around the yoke mounting portion 1c with the large-diameter portion 3c of the first output shaft 3, thereby reducing the radial dimension of torque sensor TS. Furthermore, magnetic member 20 is configured such that the one end 23a of sleeve 23 is fitted onto the large-diameter portion 3b of the first output shaft 3, while bringing the stepped part 23b into abutted-engagement with the end face of the large-diameter portion 3b. Hence, as the same manner as the other component parts (e.g., first and second yoke members 31, 32, and the like), it is possible to install or assemble and fix the magnetic member 20 from the side of input shaft 1, thereby improving the assembling workability of the device described later.

The first yoke member 31 is formed into a crank shape in longitudinal cross section, such that one end has a comparatively large diameter and the other end has a comparatively small diameter. The first yoke member is formed at the one end with a first toothed portion 41 having a plurality of claw-shaped teeth and at the other end with a first annular portion 43. The first toothed portion is formed into a substantially inverted-L shape in longitudinal cross section, such that the first toothed portion is configured as a radially-outward enlarged-diameter section, and that the plurality of claw-shaped teeth are arranged coaxially with the steering shaft (a rotation axis Z) and spaced apart from each other at given circumferential intervals around the entire circumference of magnetic member 20 and circumferentially juxtaposed to each other. The first annular portion is continuously configured along the circumferential direction of rotation axis Z and formed into an annular shape extending along one direction (upward in FIG. 2) of opposite axial directions of rotation axis Z. The first annular portion 43 is integrally connected to the roots (basal ends) of the claw-shaped teeth of the first toothed portion 41 such that the claw-shaped teeth of the first toothed portion and the first annular portion are united with each other. Hereupon, an outside diameter X4 of the first annular portion 43 is dimensioned or set less than an outside diameter X5 of the first toothed portion 41 and a second toothed portion 42 (described later).

The second yoke member 32 is formed into a crank shape in longitudinal cross section, such that one end has a comparatively small diameter and the other end has a comparatively large diameter. The second yoke member is formed at the one end with the second toothed portion 42 having a plurality of claw-shaped teeth and at the other end with a second annular portion 44. The second toothed portion is formed into a substantially inverted-L shape in longitudinal cross section, such that the second toothed portion is configured as a radially-inward reduced-diameter section, and that the plurality of claw-shaped teeth are arranged coaxially with the rotation axis Z and spaced apart from each other at given circumferential intervals around the entire circumference of magnetic member 20, and that the claw-shaped teeth of the first toothed portion 41 and the claw-shaped teeth of the second toothed portion 42 circumferentially alternate with each other. The second annular portion is continuously configured along the circumferential direction of rotation axis Z and formed into an annular shape extending along the one direction (upward in FIG. 2) of the opposite axial directions of rotation axis Z. The second annular portion 44 is integrally connected to the roots (basal ends) of the claw-shaped teeth of the second toothed portion 42 such that the claw-shaped teeth of the second toothed portion and the second annular portion are united with each other. Hereupon, an outside diameter X6 of the second annular portion 44 is set greater than the outside diameter X5 of first and second toothed portions 41, 42, and less than the inside diameter Y1 of lock nut 18. At least a part (the lower end in the shown embodiment) of the second annular portion 44 radially overlaps with the lock nut 18. That is, the second annular portion is configured to be partly accommodated in the inner peripheral side of lock nut 18.

To form one united body (hereinafter referred to as "yoke assembly YA") of the first yoke member 31 and the second yoke member 32, the claw-shaped teeth of the first toothed portion 41 and the claw-shaped teeth of the second toothed portion 42 circumferentially arranged side by side are united with each other via an insulating part 33 under a specified state where the claw-shaped teeth of the first toothed portion 41 and the claw-shaped teeth of the second toothed portion 42 are arranged to alternate with each other on the same circumference, and the second annular portion 44 is put outside of the first annular portion 43 and arranged to be radially opposed to and spaced apart from the first annular portion. Additionally, a sleeve 34, which is formed of a prescribed metal material and formed into a substantially cylindrical shape, is united with the inner peripheral side of the first annular portion 43 via the insulating part 33. The yoke assembly is fixedly connected to the outer periphery of input shaft 1 via the sleeve 34. Concretely, the above-mentioned sleeve 34 is configured as a covered cylindrical section having a shaft insertion hole 34a whose inside diameter is set less than the outside diameter X1 of yoke mounting portion 1c. Under a specified state where an upper end wall 34b of the sleeve has been fitted onto the yoke mounting portion 1c from the one end of input shaft 1 so as to bring the upper end wall 34b into abutted-engagement with the upper end face of the yoke mounting portion 1c of input shaft 1, the yoke assembly is fixedly connected to the input shaft 1 via the sleeve 34 by circumferentially laser-welding the top end of the sleeve 34 fitted onto the yoke mounting portion 1c of input shaft 1, in a similar manner to the magnetic member 20.

The previously-discussed first toothed portion 41 is constructed by a first axially-extending section 41a extending along the axial direction of rotation axis Z and radially opposed to the permanent magnet 21 and a radially-extending section 41b bent from the first axially-extending section 41a and extending along the radial direction of rotation axis Z. Similarly, the previously-discussed second toothed portion 42 is constructed by a second axially-extending section 42a extending along the axial direction of rotation axis Z and radially opposed to the permanent magnet 21 and a radially-extending section 42b bent from the second axially-extending section 42a and extending along the radial direction of rotation axis Z. By virtue of setting of the outside diameter X6 of the second annular portion 44, the second radially-extending section 42b and the permanent magnet 21 are configured to radially overlap with each other.

Each of the previously-discussed first and second magnetic concentrating rings 51, 52 is formed into a circular-arc shape having circumferential ends. Each of these magnetic concentrating rings are configured to surround the rotation axis Z within a given circumferential region exceeding 180 degrees. The first magnetic concentrating ring 51 is located inside of the second magnetic concentrating ring, whereas the second magnetic concentrating ring 52 is located outside of the first magnetic concentrating ring, such that both of the magnetic concentrating rings are arranged to radially overlap with each other. These magnetic concentrating rings are configured to have respective partly-flattened portions, namely, first and second flat portions 51a, 52a arranged to be radially opposed to each other and partly flattened in the circumferential direction. The previously-discussed magnetic sensor pair 60, 60 is accommodated and disposed in the radial clearance C2 defined between these flat portions.

To form one united body (hereinafter referred to as "ring assembly RA"), first and second magnetic concentrating rings 51, 52 are united with each other via the substantially cylindrical insulating part 53 serving as a ring retaining member formed of the same resin material as the magnetic member 20 and the yoke assembly YA. By the way, the diameter of the insulating part 53 is set to such an outside diameter X7 that permits the insulating part to be fitted to the previously-discussed ring fitting shouldered part 15c having an inside diameter greater than the lock nut 18, thereby avoiding undesirable interference with the female-screw threaded part 15b. That is, it is possible to prevent damage to the insulating part 53 owing to the undesirable interference, thus ensuring good installation of first and second magnetic concentrating rings 51, 52 (the previously-discussed ring assembly RA) onto the housing main body 11.

Additionally, the previously-discussed ring assembly RA is fitted and fixed to the ring fitting shouldered part 15c of housing main body 11, such that at least a part of the insulating part 53 radially overlaps with the lock nut 18 so as to surround the lock nut 18 within an axial region. By the way, in the shown embodiment, by virtue of elasticity of the insulating part 53, that is, with a so-called snap-fit structure, the ring assembly RA is engaged with and fixed to the housing main body 11. In this manner, the insulating part 53 and the lock nut 18 are arranged to radially overlap with each other, thereby ensuring downsizing of the device in particular in the axial direction. This contributes to the totally reduced device.

Figure 5:
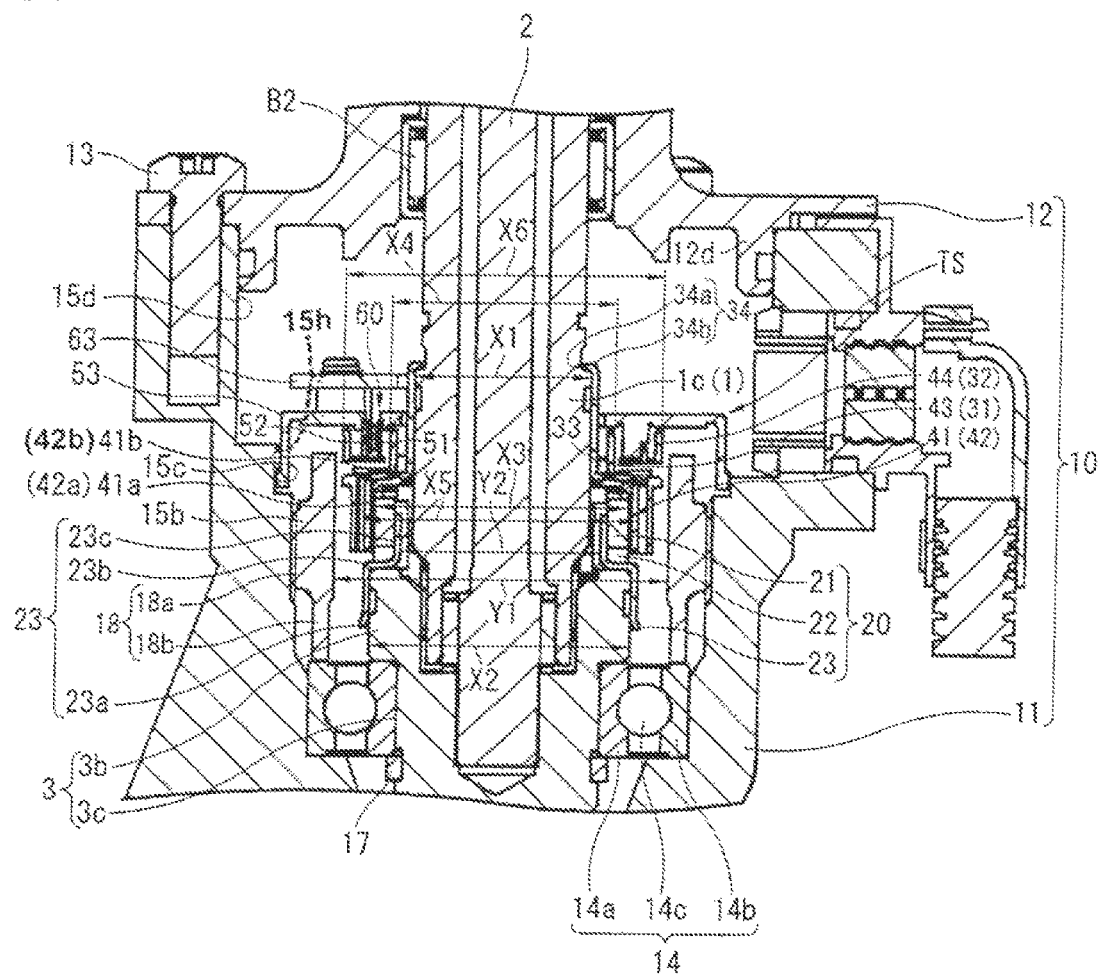
FIG. 5 is an enlarged cross-sectional view illustrating the essential part of the vicinity of the torque sensor shown in FIG. 2.
Figure 6:
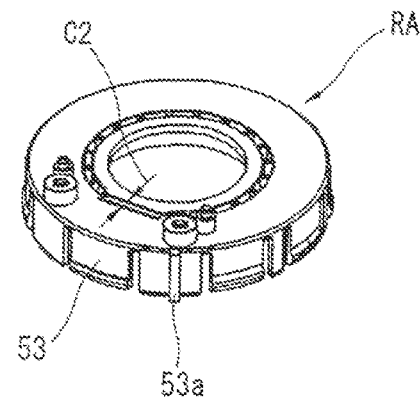
FIG. 6 is a perspective view illustrating the ring assembly itself shown in FIG. 4

In order to fit and fix the ring assembly RA, as shown in FIG. 6, the insulating part 53 has a positioning protruding part 53a formed to protrude from the outer peripheral surface. The positioning protruding part serves as an engagement part, which is brought into engagement with a positioning recessed part 15h (see FIG. 5), serving as an engaged part and formed in the inner peripheral surface of ring fitting shouldered part 15c and cut along the axial direction of rotation axis Z. The previously-noted recess-projection engagement of both the recessed part and the protruding part enables the positioning of ring assembly RA in the rotation direction. As a result of this, the assembling workability of torque sensor TS can be improved.

Figure 4:
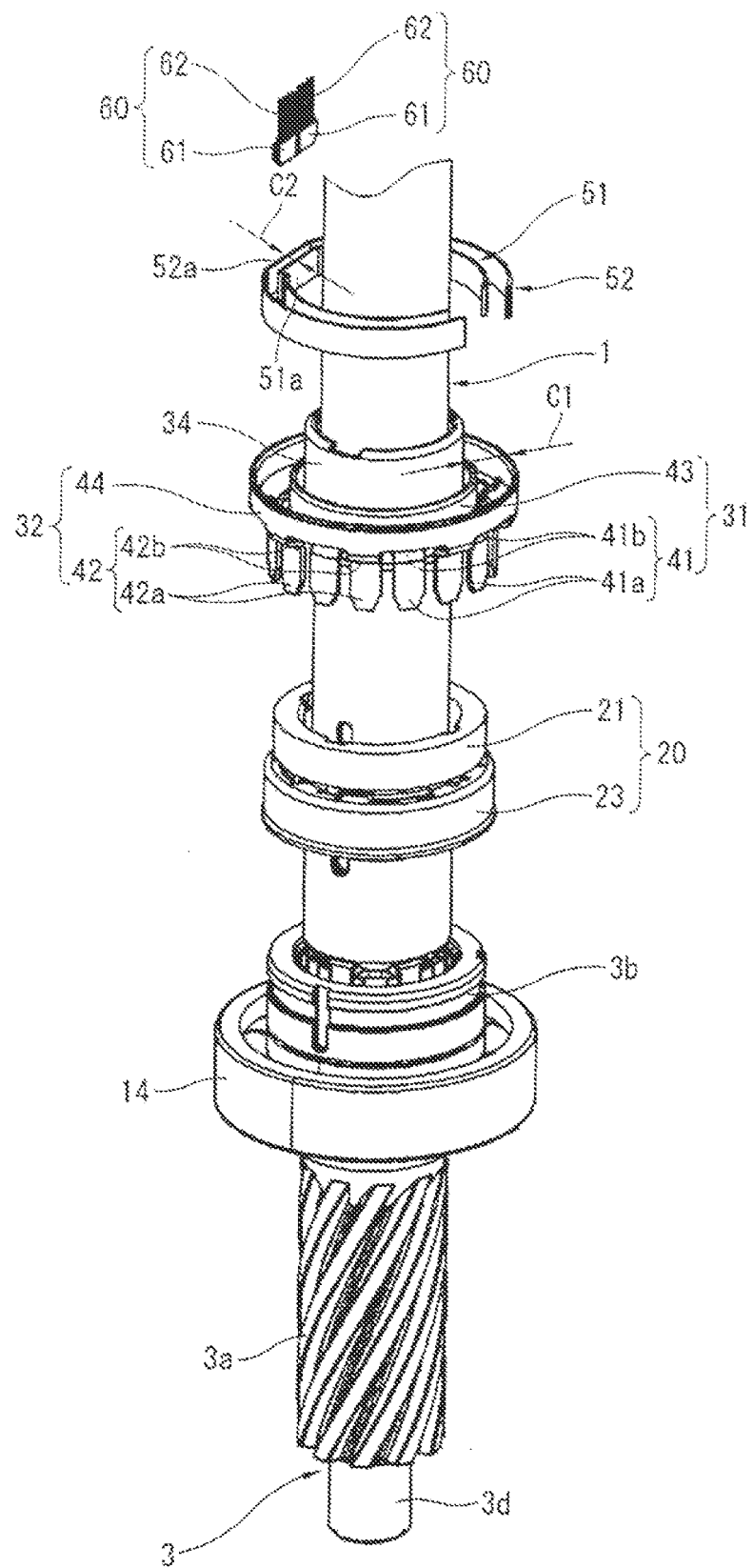
FIG. 4 is a disassembled perspective view illustrating the torque sensor shown in FIG. 3.

In particular, as shown in FIGS. 4-5, each of the previously-discussed magnetic sensors 60, 60 is accommodated and disposed in the radial clearance C2 defined between first and second magnetic concentrating rings 51, 52. Each of the magnetic sensors is constructed by a detecting element 61, which is a Hall integrated circuit (IC) having a Hall element installed therein for detecting a magnetic flux passing between the opposed magnetic concentrating rings 51, 52 (the radially-opposed flat portions 51a, 52a), and a connection terminal 62 for connecting the detecting element 61 to a control board 63 located above the torque sensor TS. That is, these magnetic sensors 60, 60 themselves are connected and fixed to the control board 63 via the connection terminals 62, 62, such that the magnetic sensor pair is accommodated and disposed in the radial clearance C2 with the predetermined air gap between first and second magnetic concentrating rings 51, 52 (i.e., first and second flat portions 51a, 52a). Hence, the magnetic sensors 60, 60 detect a magnetic flux passing between these magnetic concentrating rings 51, 52 by means of the detecting elements 61, 61, utilizing the Hall effect of the Hall elements. Output signals from the detecting elements 61, 61, which signals change responsively to the detected magnetic flux, are used for calculating torque within the control board 63.

With the previously-discussed configuration, in the shown embodiment, the outside diameter X6 of the second annular portion 44, corresponding to the maximum outside diameter of the sensor body of torque sensor TS, which is constructed by the permanent magnets 21, first and second yoke members 31, 32, and the magnetic sensor pair 60, 60 disposed between these yoke members 31, 32, is set less than the inside diameter Y1 of lock nut 18. Almost the entire axial length range L of the sensor body is accommodated in the inner peripheral side of lock nut 18. These components, namely, the torque sensor and the lock nut are configured to radially overlap with each other.

The assembling procedure of the power steering device is hereunder described in detail with reference to FIGS. 3-5.

First of all, the steering shaft is set up or assembled. That is, the upper end of torsion bar 2 is installed and fixed into the torsion-bar housing part 1a of input shaft 1, and then the fitting and inserting portion 1b, corresponding to the other end of input shaft 1, and the lower end of torsion bar 2 are inserted into the axial bore 3e of the first output shaft 3, for fixing the lower end of torsion bar 2 to the first output shaft 3.

Subsequently to the above, ball bearing 14 and torque sensor TS are assembled or mounted to the assembled steering shaft. That is, ball bearing 14 is fitted and inserted into the middle-diameter portion 3c from the other end of the first output shaft 3. The outside end face of inner race 14a is retained and locked by means of the C ring 17 in a state where the inside end face of inner race 14a of ball bearing 14 has been brought into abutted-engagement with the inside end face of the large-diameter portion 3b of the first output shaft 3. Hence, ball bearing 14 is installed and fixed to the first output shaft 3.

Thereafter, the assembled magnetic member 20 is fitted onto the large-diameter portion 3b of the first output shaft 3 from the one end of input shaft 1 such that the stepped part 23b of sleeve 23 is brought into abutted-engagement with the outside end face of the large-diameter portion 3b, thereby installing and fixing the magnetic member 20 to the large-diameter portion 3b of the first output shaft 3.

After the magnetic member 20 has been installed and assembled, yoke assembly YA is fitted onto the yoke mounting portion 1c of input shaft 1 from the one end of input shaft 1, such that the upper end wall 34b of sleeve 34 is brought into abutted-engagement with the upper end face of the yoke mounting portion 1c, thereby installing and fixing the yoke assembly YA to the yoke mounting portion 1c of input shaft 1.

Next, the steering-shaft assembly, which is constructed by assembling the ball bearing 14 and the torque sensor TS as discussed above, is inserted and disposed into the pinion housing part 11a of housing main body 11 into which the rack shaft 8 has been inserted and installed. Concretely, the small-diameter portion 3b of the first output shaft 3 is press-fitted to the output-side bearing B1 installed in the small-diameter section 16 of housing main body 11. Additionally, ball bearing 14 is press-fitted so as to bring the lower end face of outer race 14b into abutted-engagement with the inner end wall of bearing housing part 15a of housing main body 11, and hence the steering shaft is rotatably accommodated in the pinion housing part 11a.

After this, lock nut 18 is fitted and inserted from the one end of input shaft 1, while inserting the input shaft 1 and torque sensor TS into the inner peripheral side of the lock nut. The lock nut is screwed into the female-screw threaded part 15b so as to push the outer race 14b against the innermost end wall of bearing housing part 15a via the press-fit part 18b. Hence, ball bearing 14 (outer race 14b) is fastened and locked or fixed onto the housing main body 11 by means of the lock nut 18.

After lock nut 18 has been installed, ring assembly RA is fitted and inserted into the ring fitting shouldered part 15c from the one end of input shaft 1 so as to fit the ring assembly RA onto the lock nut 18. Hence, ring assembly RA is locked and fixed to the housing main body 11.

Finally, cover member 12 is fitted onto the housing main body 11 from the one end of input shaft 1 so as to fit and insert the fitting protruding part 12d of cover member 12 into the housing fitting part 15d of housing main body 11. Thereafter, housing main body 11 and cover member 12 are fastened together with the bolts 13 screwed through the bolt insertion holes 12c into the respective female-screw threaded holes 15e. In this manner, assembling of the power steering device has been completed.

As discussed previously, in the power steering device of the shown embodiment, the maximum outside diameter X6 of the sensor body of torque sensor TS is set less than the inside diameter Y1 of lock nut 18, and thus it is possible to avoid the mutual interference between the sensor body and the lock nut 18 in the radial direction.

In particular, in the shown embodiment, the sensor body and lock nut 18 are configured to radially overlap with each other within almost the entire axial length range L of the sensor body. That is, almost the entire axial length range L of the sensor body is configured such that almost the entire axial length range L of the sensor body is accommodated in the inner peripheral side of lock nut 18. Thus, it is possible to suppress upsizing of the device in the axial direction of rotation axis Z. This contributes to downsizing of the device.

By virtue of the dimensional relationship between the sensor body and lock nut 18 as discussed previously, it is possible to assemble the lock nut 18 on the housing main body 11, passing through the outer periphery of the sensor body. Accordingly, it is possible to assemble or install all of component parts around the torque sensor TS from one side (the upper side) of the housing main body 11. As a result of this, in assembling the device, it is possible to easily efficiently assemble or install the component parts without reversing the housing main body 11, thereby improving the assembling workability of the device.

Additionally, owing to the specified configuration of torque sensor TS, that is, the specified configuration such that the component parts containing the magnetic member 20 and first and second yoke members 31, 32 and the like overlap with each other in the radial direction of rotation axis Z, and that these component parts are configured to extend in the axial direction of rotation axis Z, it is possible to more effectively establish the specified dimensional relationship with the lock nut 18. That is to say, torque sensor TS is not configured to extend radially in a conventional manner, but configured to extend axially as discussed above. Hence, it is possible to realize a compact overlap-layout of the torque sensor with the lock nut 18. Therefore, by virtue of the specified dimensional relationship between the sensor body and lock nut 18, it is possible to ensure downsizing of the device.

In particular as an important factor, in the case of torque sensor TS of the embodiment, each of first and second annular portions 43, 44, both constructing part of the detecting elements, is configured to extend in the one direction of the opposite axial directions of rotation axis Z. This enables more efficient accommodation or installation of first and second annular portions 43, 44 in the inner peripheral side of lock nut 18, as compared to a conventional configuration that the sensor body is configured to extend in the radial direction of rotation axle Z. Hence, this contributes to the previously-discussed compact overlap-layout.

Regarding a specified configuration of both the annular portions 43, 44, the outside diameter X4 of the first annular portion 43 is set less than the outside diameter X5 of first and second toothed portions 41, 42, whereas the outside diameter X6 of the second annular portion 44 is set greater than the outside diameter X5 of first and second toothed portions 41, 42 and less than the inside diameter Y1 of lock nut 18. A portion of torque sensor TS, having the maximum diameter, can also be accommodated in the inner peripheral side of lock nut 18, and thus the device can be further downsized.

Furthermore, in the specified configuration of the second yoke member 32 such that the second annular portion 44 is configured to extend radially outward, the radially-extending section 42b of the second toothed portion 42, related to the outward-extending configuration, and the permanent magnet 21 are configured to overlap with each other in the axial direction of rotation axis Z. Hence, the first annular portion 43 can be further downsized. This contributes to the further downsized device.

Additionally, in arranging the magnetic member 20, the permanent magnet 21 is configured to be located in the dead space defined between the two shafts 1 and 3. Hence, the radial dimension around the permanent magnet 21 can be downsized, and thus the outside diameter of first and second toothed portions 41, 42 can be set to a further reduced dimension. This contributes to the more greatly downsized device.

The substantially cylindrical-hollow lock nut 18 is used as a fixing means for fixing or locking the ball bearing 14. Hence, it is possible to accommodate the torque sensor TS in the inner peripheral side of lock nut 18, thus ensuring downsizing of the device as discussed above.

Moreover, regarding the lock nut 18, its press-fit part 18b formed to push the ball bearing 14 is configured as a sufficiently thin-walled section, as compared to the region of formation of male-screw threaded part 18a. When fastening the lock nut 18, it is possible to promote elastic deformation of the press-fit part 18b. As a result, even when, for instance due to high temperatures, a drop in fastening torque of lock nut 18 occurs, it is possible to suppress a fall in holding power for holding or retaining the outer race 14b in place.

Additionally, lock nut 18 is formed of a zinc material having a linear expansion coefficient greater than that of an aluminum material, which is a construction material of housing main body 11. Hence, for instance when housing main body 11 has expanded owing to high temperatures, it is possible to more effectively suppress a fall in the holding power of outer race 14b.

Figure 7:
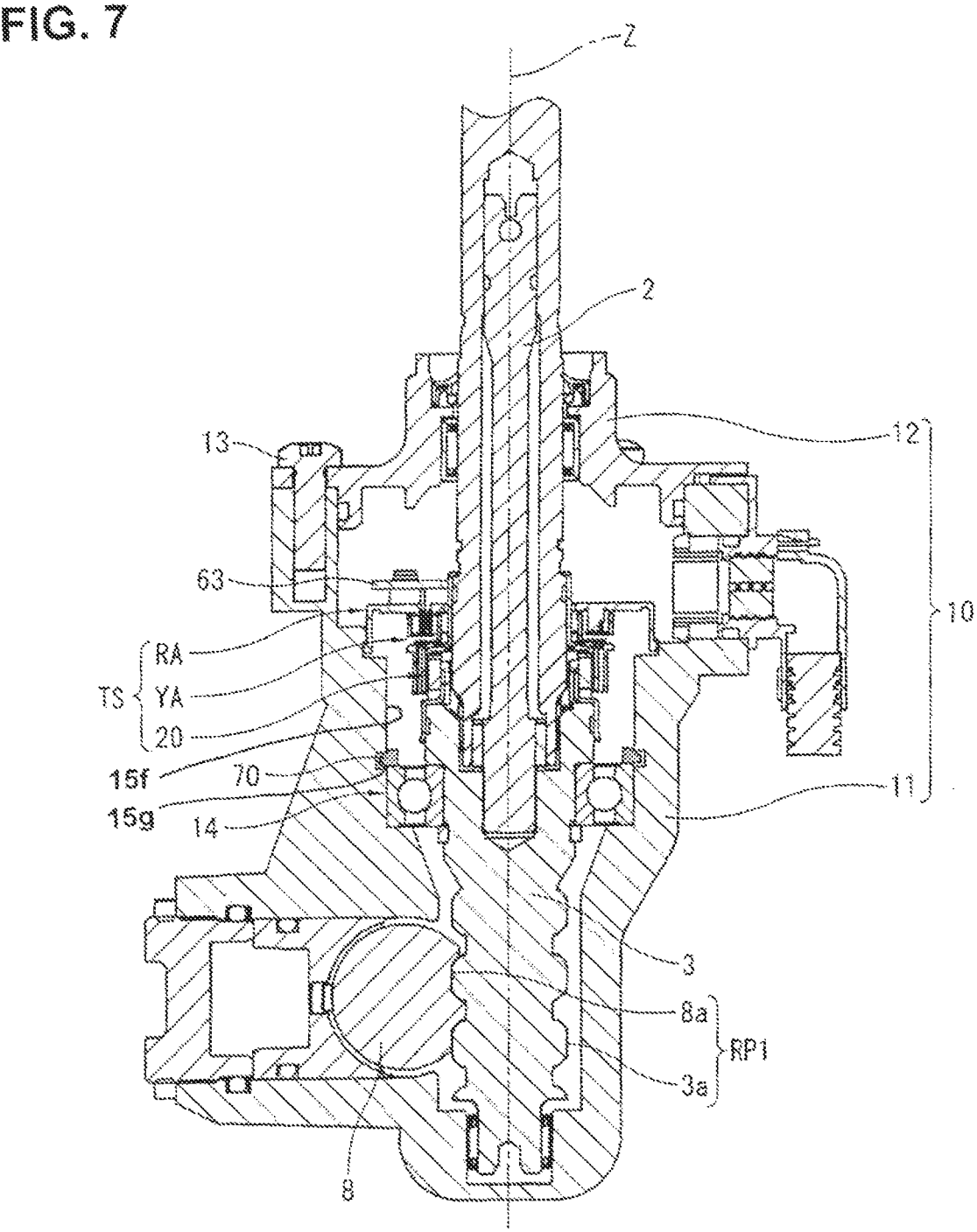
FIG. 7 is a longitudinal cross-sectional view illustrating a second embodiment of the inventive torque detection structure, corresponding to the cross section of the steering system shown in FIG. 2.

Referring to FIG. 7, there is shown the second embodiment of the inventive torque detection structure and the like. In the second embodiment, a fixing means used in the first embodiment for fixing the ball bearing 14 is modified. By the way, the fundamental configuration of the second embodiment is the same as the first embodiment except for the modified fixing means. In explaining the second embodiment, the same reference signs used to designate elements in the first embodiment will be applied to the corresponding elements used in the second embodiment, while detailed description of the same reference signs will be omitted because the above description thereon seems to be self-explanatory.

That is, instead of using the lock nut 18 as discussed previously in the first embodiment, in the second embodiment a generally-known snap ring 70 is used as a means for fixing the ball bearing 14. By the way, in the second embodiment, as a simple example snap ring 70 is shown. In lieu thereof, any type of circular-arc shaped retaining ring, such as a so-called C-type retaining ring, may be used.

Concretely, a portion, corresponding to the female-screw threaded part 15b of housing main body 11 of the first embodiment, is formed as a usual through hole having almost the same inside diameter as the adjoining bearing housing part 15a, and configured as a bearing insertion part 15f. Ball bearing 14 is locked and fixed by looking and putting the previously-discussed snap ring 70 into a ring engagement groove 15g formed or cut in the inner periphery of the lower end of bearing insertion part 15f.

With the previously-discussed configuration, basically, the second embodiment can provide the same operation and effects as the first embodiment. In particular in the second embodiment, by the use of the snap ring 70, it is possible to easily install and fix the snap ring itself in place by one-touch operation without any fastening work in the case of lock nut 18. Thus, the second embodiment has several merits, that is, the ease and simplification of assembling work of the device.

Figure 8:
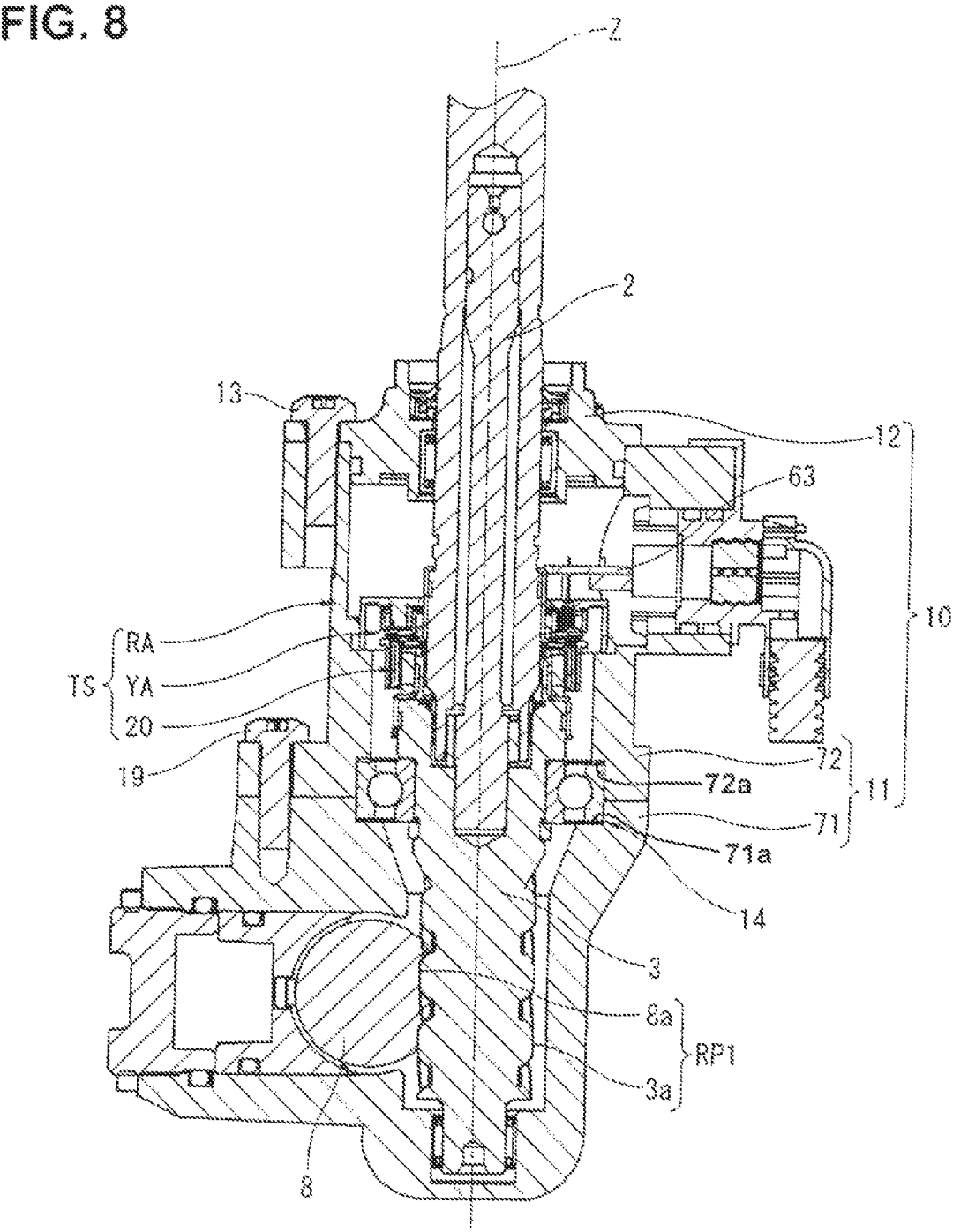
FIG. 8 is a longitudinal cross-sectional view illustrating a third embodiment of the inventive torque detection structure, corresponding to the cross section of the steering system shown in FIG. 2.

Referring to FIG. 8, there is shown the third embodiment of the inventive torque detection structure and the like. Also in the third embodiment, a fixing means used in the first embodiment for fixing the ball bearing 14 is modified. By the way, the fundamental configuration of the third embodiment is the same as the first embodiment except for the modified fixing means. In explaining the third embodiment, in a similar manner to the second embodiment, the same reference signs used to designate elements in the first embodiment will be applied to the corresponding elements used in the third embodiment, while detailed description of the same reference signs will be omitted because the above description thereon seems to be self-explanatory.

That is, instead of using the lock nut 18 (a separate member) as discussed previously in the first embodiment, separated from the housing main body 11, in the third embodiment, as a means for fixing the ball bearing 14, the housing main body 11 itself is also configured to provide the fixing means.

Concretely, the housing main body 11 as discussed in the first embodiment is further split into upper and lower halves. That is, the housing main body is constructed by a first housing 71 and a second housing 72 fastened together with a plurality of bolts 19. Ball bearing 14 is sandwiched and fixed by means of the fastened housings 71, 72 with a pair of opposed bearing retaining parts, that is, a first bearing retaining part 71a and a second bearing retaining part 72a formed at respective mating ends of first and second housings 71, 72.

With the previously discussed configuration, basically, the third embodiment can provide the same operation and effects as the first embodiment. In particular in the third embodiment, by the use of the sandwiching structure utilizing both the split housings 71, 72, there is no necessity of additionally machining the female-screw threaded part 15b or the ring engagement groove 15g in the housing main body 11. Thus, the third embodiment has several merits, that is, improved productivity of the device, such as reduced number of machining man-hours and the like.

While the foregoing is a description of the preferred embodiments carried out the invention, it will be understood that the invention is not limited to the particular embodiments shown and described herein, but that various changes and modifications may be made. For instance, a concrete configuration of each of a steering mechanism containing a steering assist type (e.g., a pinion-assist type, a rack-assist type and the like) and torque sensor TS itself, not directly related to features of the present invention, and a concrete shape and configuration of the look nut 18, snap ring 70, and split housings (first and second housings 71, 72), each serving as fixing means and related to features of the present invention, may be freely modified and changed depending on the type of applied torque detection structure, the specification of vehicle on which the device is mounted, and the like, so as to provide the operation and effects as discussed previously.

The other technical ideas grasped from the embodiments shown and described are enumerated and explained, as follows:

(a) The torque detection structure for the power steering device as recited previously, is characterized in that the first annular portion and the second annular portion are both configured to extend in one direction of the opposite axial directions of the previously-discussed rotation axis.

By virtue of the configuration as discussed above, it is possible to arrange both the first and second annular portions inside of the fixing member, as compared to such a configuration that the first and second annular portions are configured to radially extend in the radial direction of the rotation axis. This contributes to downsizing of the device.

(b) The torque detection structure for the power steering device as recited in the above item (a), is characterized in that an outside diameter of the first annular portion is set less than an outside diameter of the first toothed portion and the second toothed portion;

an outside diameter of the second annular portion is set greater than the outside diameter of the first toothed portion and the second toothed portion, and less than an inside diameter of the fixing member; and the second annular portion and the fixing member are arranged to overlap with each other in the radial direction of the rotation axis.

By virtue of the configuration as discussed above, a portion of the torque sensor having the maximum outside diameter can be accommodated in the inner peripheral aide of the fixing member. This contributes to the further downsized device.

(c) The torque detection structure for the power steering device as recited in the above item (b), is characterized in that the magnetic member and a radially-extending section formed by bending a basal end of the first toothed portion radially inward are arranged to overlap with each other in the axial direction of the rotation axis.

By virtue of the configuration as discussed above, the diameter of the first annular portion can be reduced. This contributes to the more greatly downsized device.

(d) The torque detection structure for the power steering device as recited previously, is characterized in that one of the input shaft and the output shaft is inserted into an axial bore bored in the other of the input shaft and the output shaft from the one axial side of the opposite axial directions of the rotation axis, and an outside diameter of the one of the input shaft and the output shaft at a position of an opening end of the axial bore is set less than an outside diameter of the other of the input shaft and the output shaft; and the magnetic member is arranged on an outer periphery of the one of the input shaft and the output shaft, and an inside diameter of the magnetic member is set greater than the outside diameter of the one of the input shaft and the output shaft and less than the outside diameter of the other of the input shaft and the output shaft.

By virtue of the configuration as discussed above, it is possible to arrange the magnetic member in the dead space defined by the stepped-diameter section formed between the input shaft and the output shaft. Hence, it is possible to improve the space efficiency around the magnetic member by effective utilization of the dead space. This contributes to downsizing of the device.

(e) The torque detection structure for the power steering device as recited in the above item (d), is characterized in that an outside diameter of the magnetic member is set less than the outside diameter of the other of the input shaft and the output shaft at the position of the opening end of the axial bore.

By virtue of the configuration as discussed above, it is possible to completely accommodate the magnetic member in the dead space. Hence, it is possible to further improve the space efficiency around the magnetic member, thus ensuring the further downsized device.

(f) The torque detection structure for the power steering device as recited previously, is characterized in that the fixing member is a lock nut having a male-screw threaded part formed on an outer periphery and brought into screw-threaded engagement with a female-screw threaded part formed on an inner periphery of the housing, and configured to fix the outer race by screwing the male-screw threaded part into the female-screw threaded part.

In this manner, by constructing the fixing member by the lock nut, the torque sensor can be accommodated inside of the cylindrical-hollow lock nut. Hence, this contributes to downsizing of the device (in particular, downsizing of the device in the axial direction of the rotation axis).

(g) The torque detection structure for the power steering device as recited in the above item (f), is equipped with a first magnetic concentrating ring formed of a magnetic material and interposed between the first annular portion and the magnetic sensor for transmitting a change in magnetic field of the first annular portion to the magnetic sensor;

a second magnetic concentrating ring formed of a magnetic material and interposed between the second annular portion and the magnetic sensor for transmitting a change in magnetic field of the second annular portion to the magnetic sensor; and a ring retaining member having a protruding part fitted to a recessed part formed in the inner periphery of the housing on a side of the axial opening with respect to the female-screw threaded part, and configured to retain the first magnetic concentrating ring and the second magnetic concentrating ring.

By virtue of the configuration as discussed above, it is possible to avoid interference between the protruding part of the ring retaining member and the female-screw threaded part, thus preventing the protruding part from being damaged owing to the interference.

(h) The torque detection structure for the power steering device as recited in the above item (g), is characterized in that the protruding part of the ring retaining member is formed into a cylindrical shape so as to surround the fixing member, and at least a part of the ring retaining member is configured to overlap with the fixing member in the radial direction of the rotation axis.

By virtue of the configuration as discussed above, it is possible to ensure downsizing of the device in particular in the axial direction.

(i) The torque detection structure for the power steering device as recited in the above item (h), is characterized in that the ring retaining member has a positioning engagement part for positioning the ring retaining member in a rotation direction with respect to the housing; and the housing has a positioning engaged part with which the positioning engagement part is brought into engagement.

By virtue of the configuration as discussed above, it is possible to position the ring retaining member in the rotation direction. Hence, this improves the assembling workability of the device.

(j) The torque detection structure for the power steering device as recited in the above item (f), is characterized in that a region of the lock nut serving as the fixing member, formed on a side of the ball bearing with respect to the male-screw threaded part, is configured as a thin-walled section as compared to a region of formation of the male-screw threaded part.

In this manner, the vicinity of the press-fit part of the fixing member onto the outer race is configured as the thin-walled section as compared to the fastened screw-threaded part. Hence, when fastening the lock nut, it is possible to promote elastic deformation of the press-fit part. As a result, even when, for instance due to high temperatures, a drop in fastening torque of the lock nut occurs, it is possible to suppress a fall in holding power for retaining the outer race in place.

(k) The torque detection structure for the power steering device as recited in the above item (j), is characterized in that the fixing member is formed of a zinc material.

Generally, such a zinc material has a linear expansion coefficient greater than an aluminum or iron material, which constructs the housing. By virtue of the configuration as discussed above, it is possible to suppress a fall in holding power for retaining the outer race in place at high temperatures (during expansion of the housing).

(l) The torque detection structure of the power steering device as recited previously, is characterized in that the housing has a circular-arc or annular engagement groove formed in an inner peripheral surface; and the fixing member is either a C ring configured to engage with the engagement groove or a snap ring configured to engage with the engagement groove.

In this manner, by constructing the fixing member by a retaining ring, such as a C ring or the like, it is possible to facilitate assembling work of the fixing member itself. Hence, this improves the assembling workability of the device.

(m) The torque detection structure for the power steering device as recited previously, is characterized in that the housing is constructed by a first housing and a second housing, which housings are configured to have split mating faces formed on a side of the axial opening with respect to a bottom face of the ball bearing installed on the first housing; and the fixing member is constructed by the second housing arranged on the side of the axial opening, and configured such that the ball bearing is fixed by sandwiching the ball bearing between the first housing and the second housing with the split mating faces brought into abutted-engagement with each other.

By virtue of the configuration as discussed above, there is no necessity of providing the female-screw threaded part or the engagement groove in the housing. Hence, this contributes to the improved productivity, such as reduced number of machining man-hours and the like.

(n) The power steering device as recited previously, is characterized in that the torque sensor is comprised of:

a magnetic member configured to be rotatable together with the output shaft and arranged coaxially with the rotation axis such that two different poles alternate with each other in a circumferential direction;

a first yoke member having a first toothed portion with a plurality of claw-shaped teeth arranged coaxially with the rotation axis so as to oppose the magnetic member in a radial direction of the rotation axis, and a first annular portion configured to integrally connect the claw-shaped teeth of the first toothed portion with each other and formed of a magnetic material and provided to be rotatable together with the input shaft;

a second yoke member having a second toothed portion with a plurality of claw-shaped teeth arranged coaxially with the rotation axis so as to oppose the magnetic member in the radial direction of the rotation axis such that the claw-shaped teeth of the first toothed portion and the claw-shaped teeth of the second toothed portion circumferentially alternate with each other, and a second annular portion arranged to be opposed to and spaced apart from the first annular portion and configured to integrally connect the claw-shaped teeth of the second toothed portion with each other and formed of a magnetic material and provided to be rotatable together with the input shaft; and a magnetic sensor having a Hall element detecting a change in magnetic field between the first annular portion and the second annular portion caused by a change in relative angle of the first and second toothed portions and the magnetic member, arising from torsional deformation of the torsion bar.

By virtue of the configuration as discussed above, it is possible to reduce the radial size of torque sensor TS. Hence, this contributes to downsizing of the device (in particular downsizing in the radial direction), while suppressing the interference between fixing member and the torque sensor in the radial direction.

(o) The power steering device as recited in the above item (n), is characterized in that the fixing member and the torque sensor are configured to overlap with each other in the radial direction of the rotation axis.

By virtue of the configuration as discussed above, it is possible to reduce the axial size of the device.

REFERENCE SIGNS LIST

1 . . . Input shaft
2 . . . Torsion bar
3 . . . First output shaft (Output shaft)
11 . . . Housing main body (Housing)
14 . . . Ball bearing
14a . . . Inner race
14b . . . Outer race
14c . . . Balls
18 . . . Lock nut (Fixing member)
SW . . . Steering wheel
WR, WL . . . Steered road wheels
TS . . . Torque sensor
Z . . . Rotation axis (Rotation axis of steering shaft)

The invention claimed is:

1. A torque detection structure for a power steering device mounted on an automotive vehicle for detecting a steering torque by a driver, comprising:

a steering shaft having an input shaft configured to rotate in synchronism with rotation of a steering wheel and an output shaft connected via a torsion bar to the input shaft for transmitting rotation from the input shaft to steered road wheels;

a housing having one axial opening formed on one axial side of opposite axial directions of a rotation axis of the steering shaft and configured to accommodate the output shaft in the housing;

a ball bearing having an inner race, balls, and an outer race and inserted from the one axial opening and accommodated and disposed in the housing for rotatably supporting the output shaft in the housing;

a fixing member formed into a circular-arc shape or an annular shape and inserted and disposed from the one axial opening into the housing and configured to fix the outer race to the housing with the fixing member fixed to the housing in a state where one end of the fixing member has been brought into abutted-engagement with the outer race; and a torque sensor having an outside diameter set less than an inside diameter of the fixing member and configured to generate an electrical signal that changes in accordance with an amount of torsional deformation of the torsion bar, wherein the torque sensor comprises a magnetic member configured to be rotatable together with the output shaft and arranged coaxially with the rotation axis such that two different poles alternate with each other in a circumferential direction;

a first yoke member having a first toothed portion with a plurality of claw-shaped teeth arranged coaxially with the rotation axis so as to oppose the magnetic member in a radial direction of the rotation axis, and a first annular portion configured to integrally connect the claw-shaped teeth of the first toothed portion with each other and formed of a magnetic material and provided to be rotatable together with the input shaft;

a second yoke member having a second toothed portion with a plurality of claw-shaped teeth arranged coaxially with the rotation axis so as to oppose the magnetic member in the radial direction of the rotation axis such that the claw-shaped teeth of the first toothed portion and the claw-shaped teeth of the second toothed portion circumferentially alternate with each other, and a second annular portion arranged to be opposed to and spaced apart from the first annular portion and configured to integrally connect the claw-shaped teeth of the second toothed portion with each other and formed of a magnetic material and provided to be rotatable together with the input shaft; and a magnetic sensor having a Hall element detecting a change in magnetic field between the first annular portion and the second annular portion caused by a change in relative angle of the first and second toothed portions and the magnetic member, arising from torsional deformation of the torsion bar.

2. The torque detection structure for the power steering device as recited in claim 1, wherein:

the housing has a circular-arc or annular engagement groove formed in an inner peripheral surface; and the fixing member is either a C ring configured to engage with the engagement groove or a snap ring configured to engage with the engagement groove.

3. The torque detection structure for the power steering device as recited in claim 1, wherein:

the fixing member and the torque sensor are configured to overlap with each other in the radial direction of the rotation axis.

4. The torque detection structure for the power steering device as recited in claim 3, wherein:

the first annular portion and the second annular portion are both configured to extend in one direction of the opposite axial directions of the rotation axis.

5. The torque detection structure for the power steering device as recited in claim 4, wherein:

an outside diameter of the first annular portion is set less than an outside diameter of the first toothed portion and the second toothed portion;

an outside diameter of the second annular portion is set greater than the outside diameter of the first toothed portion and the second toothed portion, and less than an inside diameter of the fixing member; and the second annular portion and the fixing member are arranged to overlap with each other in the radial direction of the rotation axis.

6. The torque detection structure for the power steering device as recited in claim 5, wherein:

the magnetic member and a radially-extending section formed by bending a basal end of the first toothed portion radially inward are arranged to overlap with each other in the axial direction of the rotation axis.

7. The torque detection structure for the power steering device as recited in claim 1, wherein:

one of the input shaft and the output shaft is inserted into an axial bore bored in the other of the input shaft and the output shaft from the one axial side of the opposite axial directions of the rotation axis, and an outside diameter of the one of the input shaft and the output shaft at a position of an opening end of the axial bore is set less than an outside diameter of the other of the input shaft and the output shaft; and the magnetic member is arranged on an outer periphery of the one of the input shaft and the output shaft, and an inside diameter of the magnetic member is set greater than the outside diameter of the one of the input shaft and the output shaft and less than the outside diameter of the other of the input shaft and the output shaft.

8. The torque detection structure for the power steering device as recited in claim 7, wherein:

an outside diameter of the magnetic member is set less than the outside diameter of the other of the input shaft and the output shaft at the position of the opening end of the axial bore.

9. The torque detection structure for the power steering device as recited in claim 1, wherein:

the fixing member is a lock nut having a male-screw threaded part formed on an outer periphery and brought into screw-threaded engagement with a female-screw threaded part formed on an inner periphery of the housing, and configured to fix the outer race by screwing the male-screw threaded part into the female-screw threaded part.

10. The torque detection structure for the power steering device as recited in claim 9, which further comprises:

a first magnetic concentrating ring formed of a magnetic material and interposed between the first annular portion and the magnetic sensor for transmitting a change in magnetic field of the first annular portion to the magnetic sensor;

a second magnetic concentrating ring formed of a magnetic material and interposed between the second annular portion and the magnetic sensor for transmitting a change in magnetic field of the second annular portion to the magnetic sensor; and a ring retaining member having a protruding part fitted to a recessed part formed in the inner periphery of the housing on a side of the axial opening with respect to the female-screw threaded part, and configured to retain the first magnetic concentrating ring and the second magnetic concentrating ring.

11. The torque detection structure for the power steering device as recited in claim 10, wherein:
the protruding part of the ring retaining member is formed into a cylindrical shape so as to surround the fixing member, and at least a part of the ring retaining member is configured to overlap with the fixing member in the radial direction of the rotation axis.

12. The torque detection structure for the power steering device as recited in claim 11, wherein:
the ring retaining member has a positioning engagement part for positioning the ring retaining member in a rotation direction with respect to the housing; and
the housing has a positioning engaged part with which the positioning engagement part is brought into engagement.

13. The torque detection structure for the power steering device as recited in claim 9, wherein:
a region of the lock nut serving as the fixing member, formed on a side of the ball bearing with respect to the male-screw threaded part, is configured as a thin-walled section as compared to a region of formation of the male-screw threaded part.

14. The torque detection structure for the power steering device as recited in claim 13, wherein:
the fixing member is formed of a zinc material.

15. The torque detection structure for the power steering device as recited in claim 1, wherein:
the input shaft is inserted into an axial bore bored in the output shaft from the one axial side of the opposite axial directions of the rotation axis, and an outside diameter of the input shaft at a position of an opening end of the axial bore is set less than an outside diameter of the output shaft; and
the magnetic member is fixed to the output shaft, while abutting on one axial end face of the opposite axial directions of the rotation axis, and an inside diameter of the magnetic member is set greater than the outside diameter of the input shaft.

16. A torque detection structure for a power steering device mounted on an automotive vehicle for detecting a steering torque by a driver, comprising:
a steering shaft having an input shaft configured to rotate in synchronism with rotation of a steering wheel and an output shaft connected via a torsion bar to the input shaft for transmitting rotation from the input shaft to steered road wheels;
a housing having one axial opening formed on one axial side of opposite axial directions of a rotation axis of the steering shaft and configured to accommodate the output shaft in the housing;
a ball bearing having an inner race, balls, and an outer race and inserted from the one axial opening and accommodated and disposed in the housing for rotatably supporting the output shaft in the housing;
a fixing member formed into a circular-arc shape or an annular shape and inserted and disposed from the one axial opening into the housing and configured to fix the outer race to the housing with the fixing member fixed to the housing in a state where one end of the fixing member has been brought into abutted-engagement with the outer race; and
a torque sensor having an outside diameter set less than an inside diameter of the fixing member and configured to generate an electrical signal that changes in accordance with an amount of torsional deformation of the torsion bar,
wherein the housing is constructed by a first housing and a second housing, which housings are configured to have split mating faces formed on a side of the axial opening with respect to a bottom face of the ball bearing, the bottom face being located in the first housing; and
wherein the fixing member is constructed by the second housing arranged on the side of the axial opening, and configured such that the ball bearing is fixed by sandwiching the ball bearing between the first housing and the second housing with the split mating faces brought into abutted-engagement with each other.

17. A power steering device, comprising:
a steering mechanism comprising a steering shaft having an input shaft configured to rotate in synchronism with a steering operation of a steering wheel and an output shaft connected via a torsion bar to the input shaft such that rotation from the input shaft is transmitted to the output shaft, and a motion converter configured to convert rotation of the output shaft into a turning operation of steered road wheels;
a housing having one axial opening formed on one axial side of opposite axial directions of a rotation axis of the steering shaft and configured to accommodate the output shaft in the housing;
a ball bearing having an inner race, balls, and an outer race and inserted from the one axial opening and accommodated and disposed in the housing for rotatably supporting the output shaft in the housing;
a fixing member formed into a circular-arc shape or an annular shape and inserted and disposed from the one axial opening into the housing and configured to fix the outer race to the housing with the fixing member fixed to the housing in a state where one end of the fixing member has been brought into abutted-engagement with the outer race;
a torque sensor having an outside diameter set less than an inside diameter of the fixing member and configured to generate an electrical signal that changes in accordance with an amount of torsional deformation of the torsion bar, for detecting a driver's steering torque arising from the steering operation inputted to the input shaft; and
an electric motor configured to apply a steering force to the steering mechanism responsively to the output signal from the torque sensor,
wherein the torque sensor comprises
a magnetic member configured to be rotatable together with the output shaft and arranged coaxially with the rotation axis such that two different poles alternate with each other in a circumferential direction;
a first yoke member having a first toothed portion with a plurality of claw-shaped teeth arranged coaxially with the rotation axis so as to oppose the magnetic member in a radial direction of the rotation axis, and a first annular portion configured to integrally connect the claw-shaped teeth of the first toothed portion with each other and formed of a magnetic material and provided to be rotatable together with the input shaft;
a second yoke member having a second toothed portion with a plurality of claw-shaped teeth arranged coaxially with the rotation axis so as to oppose the magnetic member in the radial direction of the rotation axis such that the claw-shaped teeth of the first toothed portion and the claw-shaped teeth of the second toothed portion circumferentially alternate with each other, and a second annular portion arranged to be opposed to and spaced apart from the first annular portion and configured to integrally connect the claw-shaped teeth of the second toothed portion with each other and formed of a magnetic material and provided to be rotatable together with the input shaft; and a magnetic sensor having a Hall element detecting a change in magnetic field between the first annular portion and the second annular portion caused by a change in relative angle of the first and second toothed portions and the magnetic member, arising from torsional deformation of the torsion bar.

18. The power steering device as recited in claim 17, wherein:

the fixing member and the torque sensor are configured to overlap with each other in the radial direction of the rotation axis.

* * * * *